Oct. 7, 1924.  
E. G. WATROUS  
VEHICLE SEAT  
Filed Feb. 28, 1923  
1,510,969  
3 Sheets-Sheet 1

Inventor  
Earl G. Watrous.  
By Rector, Hibben, Davis and Macauley  
Attys

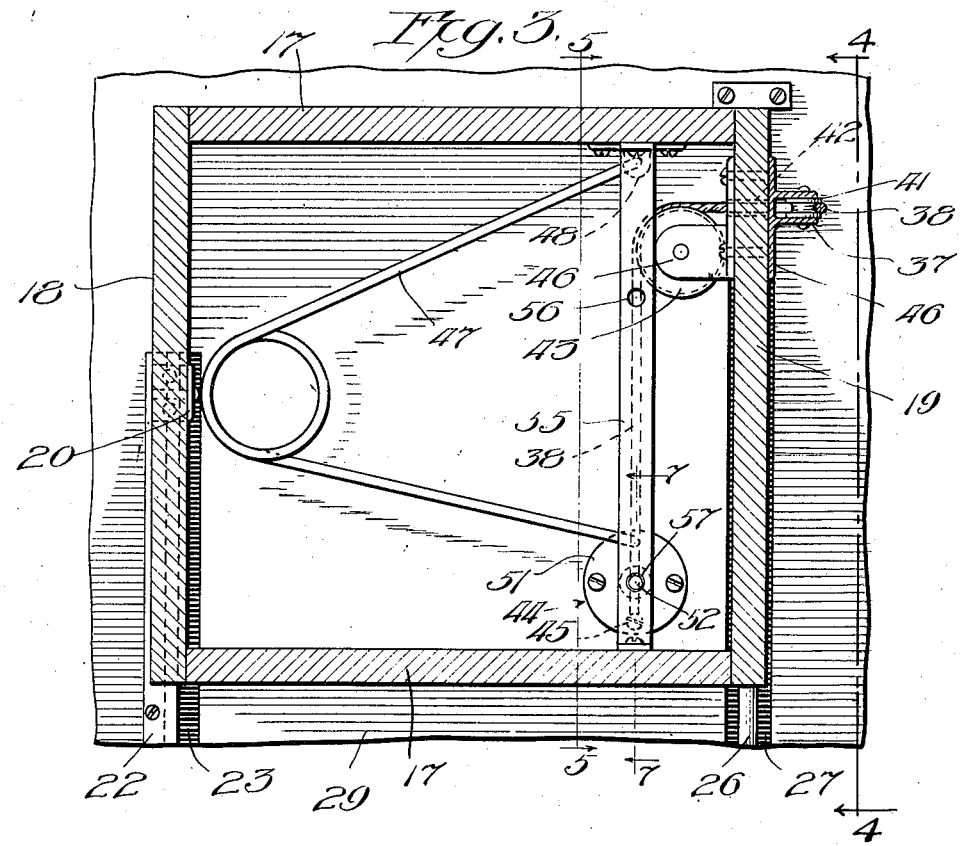
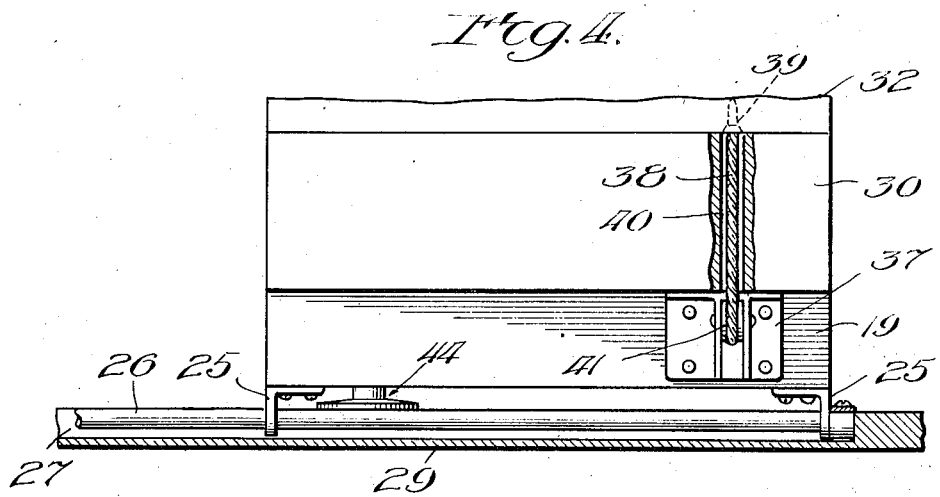

Oct. 7, 1924.

E. G. WATROUS

VEHICLE SEAT

Filed Feb. 28, 1923

1,510,969

3 Sheets-Sheet 3

Inventor;
Earl G. Watrous
By Rector, Hibben, Davis & Macauley
Attys

Patented Oct. 7, 1924.

1,510,969

UNITED STATES PATENT OFFICE.

EARL G. WATROUS, OF CHICAGO, ILLINOIS.

VEHICLE SEAT.

Application filed February 28, 1923. Serial No. 621,842.

*To all whom it may concern:*

Be it known that I, EARL G. WATROUS, a citizen of the United States, residing at Chicago, in the county of Cook and State of Illinois, have invented certain new and useful Improvements in Vehicle Seats, of which the following is a specification.

My invention relates to seats for automobiles and other vehicles and more particularly to improvements in movable seats, such as that located beside the driver's seat of an automobile. It is customary in various types or styles of automobile bodies, such as the coupé and brougham, in which the driver's seat is positioned forwardly of the rear seat, to provide a swinging or folding seat beside or adjacent the driver's seat and in front of the rear seat, this movable seat being so constructed that it may be swung or folded out of the way, usually to a position under the cowl and instrument board. This front or auxiliary seat is made movable as, in some types of bodies such as the brougham, it is adjacent the door through which the passengers enter and leave the vehicle, and if the seat were not movable it would be in the way and make it extremely inconvenient for a passenger to pass to and from the rear seat in entering and leaving the vehicle. I have found that many of these swinging and folding seats now in use are complicated in construction and cannot be conveniently and expeditiously folded or swung out of the way. It is the principal object of my invention to provide a movable seat which may be conveniently and quickly moved toward the driver's seat to afford an unobstructed passage between the movable seat and the side of the body, hence permitting easy ingress to, and egress from the back seat. To this end, the back of the movable seat is pivoted to the bottom of the seat and novel and improved means are provided so that, when the back is swung relative to the bottom, the seat is automatically shifted toward the driver's seat. Convenient and simple latching means is also provided for latching the seat either in its normal or its moved position.

With the above and incidental objects in view, the invention consists in certain novel features of construction and combination of parts, the essential elements whereof are recited in the appended claims, and a preferred form of embodiment of which is described in detail hereinafter and illustrated in full in the accompanying drawings, which form part of this specification.

Figure 1:
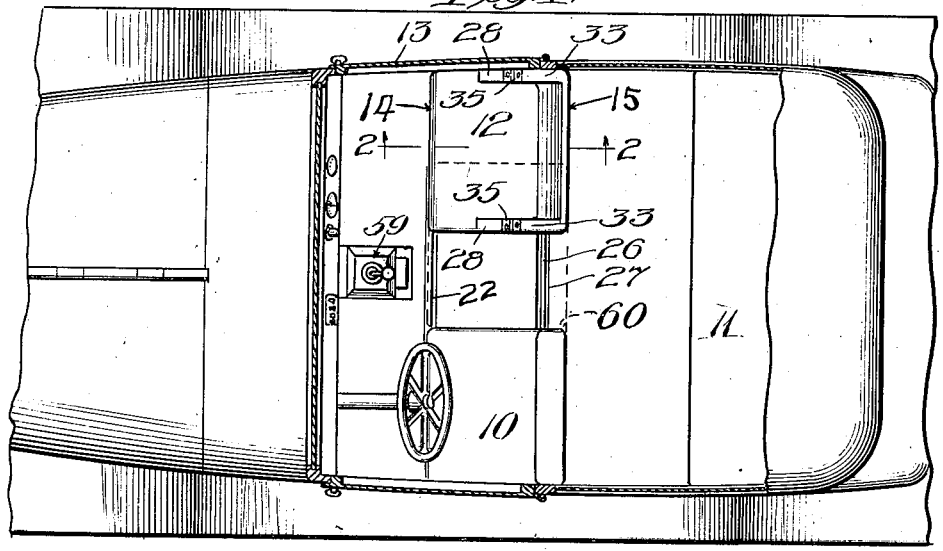
Figure 2:
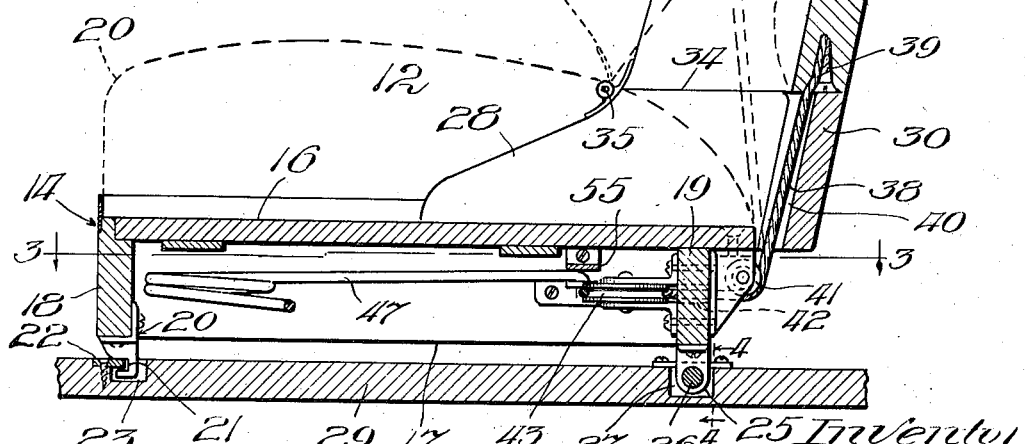
Figure 5:
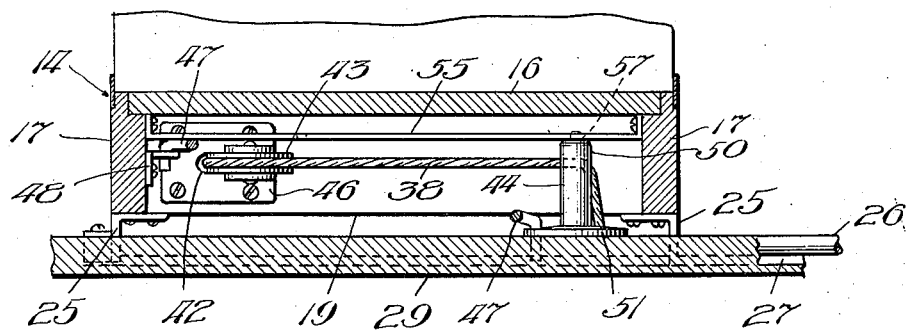
Figure 6:
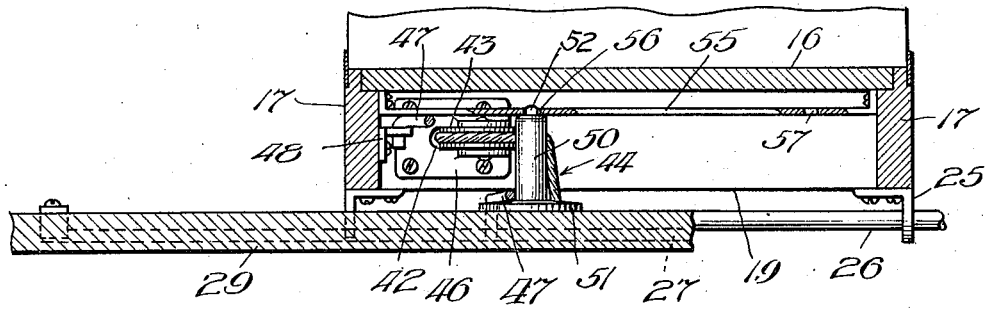

Of said drawings, Fig. 1 is a top plan view of an automobile body with the top shown mostly in section, in order to disclose the seating arrangement; Fig. 2 is a cross-section through the movable seat, being taken substantially on the line 2—2 of Fig. 1; Fig. 3 is a horizontal section through the bottom of the movable seat, being taken on the line 3—3 of Fig. 2; Fig. 4 is a rear view of the bottom of the movable seat showing the swinging back broken away and the floor of the vehicle in section on the line 4—4 of Fig. 3; Fig. 5 is a detail section taken on the line 5—5 of Fig. 3 and showing the movable seat in its normal position; Fig. 6 is a corresponding view showing the movable seat in its moved position, and Fig. 7 is a detail section through the latching means, the section being taken on the line 7—7 of Fig. 3.

Referring more particularly to Fig. 1, it will be observed that, in the type of automobile body disclosed, there is a driver's seat 10 back of the steering wheel, a rear seat 11, and a movable seat 12, which is situated beside the driver's seat and in front of the rear seat. The door 13 is customarily used for ingress to, and egress from, the vehicle by the passengers using the back seat and the movable seat.

The movable seat comprises a seat portion or bottom 14 and a swinging back 15. The bottom consists of a base-board 16, the supporting frame therefor, comprising side bars 17, a front cross-bar 18 and a rear cross-bar 19, and a cushion 20, illustrated in dash lines in Fig. 2 for the sake of convenience, and mounted on the base-board in any desired manner. Secured to the front cross-bar 18 is a bracket 20 having an arm provided with a recess 21 into which projects one edge of a plate 22 which extends partially over a channel 23 in the floor 29 of the automobile body and into which the arm of the bracket extends. The upper edge of the recess 21 rests on the plate 22. Secured to the under side of and at each end of the rear cross-bar 19 are brackets 25 having eyes or holes through which a rod 26, located in a channel 27 in the floor 29, projects, the movable seat being supported for sliding movement toward and away from the driver's seat through these brackets 20 and 25 riding on the plate 22 and the rod 26, respectively. Mounted on top of and at each side of the base-board 16 is a side arm or bracket 28, and to the rear edges of these arms and the rear edge of the base-board 16 is secured a bar or member 30 in alignment with, and forming in effect a lower extension of, the back-board 32 of the swinging back 15 when the swinging back is in the normal position shown in Fig. 2. Secured to the side edges of the back-board 32 are the side arms 33 of the movable seat. In alignment with the meeting edges 34 of the arms 28 and 33 are the pivots of hinges 35 by means of which the back 15 is pivoted to the bottom. The back may be upholstered in any desired way, the cushion being indicated by dotted lines 36 for the sake of convenience.

Figure 7:
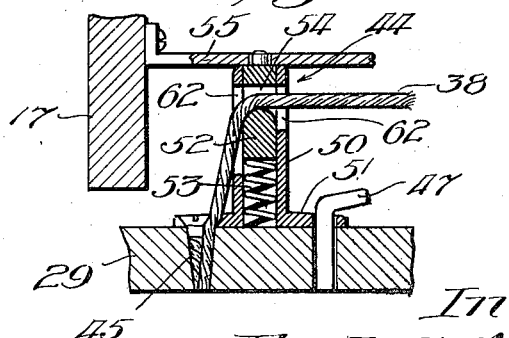

One end of a flexible cord or rope 38, which may be of any desired material or form, is secured by means of a screw 39 to the lower edge of the back plate 32 (Figs. 2 and 4) and from thence the cord extends downwardly through a channel or groove 40 in the bar 30, over a pulley wheel 41, horizontally through a hole 42 in the rear cross-bar 19, over a horizontal pulley wheel 43, and thence through a latch 44, the end of the cord adjacent the latch, being secured to the floor 29 by the screw 45, as best shown in Fig. 7. The wheels 41 and 43 are carried in brackets 37 and 46 secured to the cross-bar 19.

A V-shaped spring 47 (Fig. 3) has one bent end projecting through a bracket 48 on the outer side-bar 17 and its other bent end projecting through an opening in the floor 29, as shown in Fig. 7, the spring intermediate its ends being coiled so that the spring normally tends to retain the movable seat in the position shown in Figs. 1 and 3 and serves to return the seat to such position after it has been moved toward the driver's seat and then released, as will be presently pointed out.

The latch 44 (Fig. 7) comprises a bracket having a vertical tubular portion 50 and a base portion 51 by which it is fastened to the floor 29. The bracket is provided with aligned slots 62 through which the cord 38 passes. Mounted in the tubular portion 50 is a plunger or bolt 52 supported by a compressed spring 53. The plunger 52 is provided with a slot 54 through which the cord 38 also passes, the lower edge of this slot being rounded to afford a smooth bearing surface for the cord.

Extending between, and secured at its ends to the side bars 17, is a latch plate 55 provided with two holes 56 and 57. When the seat is toward the right, in the position shown in Figs. 1 and 5, the upper reduced end of the plunger 52 is seated in the hole 57 to latch the seat in its normal position.

From the above description it will be obvious that when the movable seat is in the position shown in Fig. 1, a passenger may pass from the rear seat to the front seats, and vice versa, by means of the passage between the driver's seat and the movable seat. When, however, a passenger in the rear seat wishes to leave the car it is very inconvenient to pass between the seats and then stoop down and slide along the movable seat until the passenger is in a position to pass out through the door 13, or vice versa when the passenger is entering the vehicle. The passenger's progress would also be interfered with by the control lever and hand-brake lever which are usually to the right of the driver's seat and which are indicated generally by the reference numeral 59 in Fig. 1. When the movable seat is shifted toward the left, as indicated by the dotted lines 60 in Fig. 1, so that the passage between two seats is closed, it will be seen that an unobstructed passage is provided between the side of the body and the outer side of the movable seat and that the passenger may, after entering the door, freely and easily pass through this passage to the rear seat, and vice versa. To slide the movable seat toward the driver's seat, it is only necessary to tilt or swing the back 15 of the movable seat forwardly to the dotted line position shown in Fig. 2. During the beginning of this movement of the back, the cord 38 is drawn taut, the seat being latched in normal position by the engagement of the bolt in the hole 57, so that the cord causes the bolt 52 to be depressed against the action of its spring 53, hence releasing the movable seat, so that upon continued movement of the back the cord moves over the pulley wheels 41 and 43, and forces the movable seat over against the driver's seat. At the end of this sliding movement, not only is the movable seat out of the way, but the back is also tilted forwardly so that the passenger in the back seat can readily stand and move around the seat without being hindered by the back. At the end of the sliding movement of the movable seat toward the driver's seat, at which time the back is released, the reduced end of the latching plunger engages the other hole 56 to latch the movable seat in its moved position, in which position it may be so retained, if desired. If the movable seat is not moved over the entire distance toward the driver's seat, the spring 47 moves it back toward the right to its normal position when the back of the seat is released, as the seat has not been moved far enough to the left to be latched in its moved position. After the seat has been latched in its moved position, it may be released, after the back has been released, by gripping the cord with the fingers between the pulley 41 and the screw 39 and pulling on it to force the bolt out of engagement with the hole 56.

I claim:

1. In combination, a seat, comprising a bottom and a back movable relative to the bottom, means for slidably supporting said seat at an invariable height, and means connected to the back and operated thereby for automatically sliding said seat in a horizontal plane when the back is moved relative to said bottom.

2. In combination, a seat, comprising a bottom and a back adapted to swing forwardly relative to said bottom, means for supporting said seat for transverse sliding movement, and means for automatically effecting sidewise sliding movement of the seat when said back is swung forwardly relative to said bottom.

3. In combination, a seat, comprising a bottom and a back movable relative to said bottom, and pulley means including a cord fastened to said back and the floor for causing movement of said seat when the back is moved relative to said bottom.

4. In combination, a seat, comprising a bottom and a back pivoted for relative swinging movement, means for supporting said seat for sidewise sliding movement, and means for automatically sliding said seat sidewise on said supporting means by such relative swinging movement.

5. In combination, a seat comprising a bottom and a back pivoted for relative swinging movement, means for supporting said seat for sliding sidewise movement, a latch for latching said seat, and pulley means for releasing said latch and automatically sliding said seat sidewise on said supporting means by such relative swinging movement.

6. In combination, a seat, comprising a bottom and a back pivoted to said bottom for forward swinging movement, means for supporting said seat for sidewise sliding movement, pulley means including a cord connected to said back for sliding said seat sidewise when the back is swung forwardly relative to the bottom.

7. In combination, a seat comprising a bottom and a back movable relative to said bottom, a latch for latching said seat in normal position, and means for automatically releasing said latch and automatically moving said seat when the back is moved relative to the bottom.

8. In combination, a seat comprising a bottom and a back movable relative to said bottom, a latch for latching said seat in normal and moved positions, and means for automatically releasing said latch and automatically moving said seat when the back is moved relative to said bottom.

9. In combination, a seat comprising a bottom and a back pivoted to said bottom, means for supporting said seat for sidewise sliding movement, a latch for latching said seat, and a flexible member secured to said back and cooperating with said latch for unlatching said latch and sliding said seat sidewise when the back is swung relative to said bottom.

10. In combination, a seat comprising a bottom and a back pivoted to said bottom, means for supporting said seat for sidewise sliding movement, a vertical wheel and a horizontal wheel on said seat, and a flexible member extending over said wheels and secured to said back for sliding said seat sidewise when the back is moved relative to said bottom.

11. In combination, a seat comprising a bottom and a back pivoted to said bottom, means for supporting said seat for sidewise sliding movement, a vertical wheel and a horizontal wheel on said seat, a latch for latching said seat, and a flexible member passing over said wheels and coacting with said latch for releasing said latch and sliding said seat sidewise when the back is swung relative to the bottom.

12. In combination, a seat comprising a bottom and a back pivoted to said bottom, means for supporting said seat for sliding movement, a latch for latching said seat, a flexible member for releasing said latch and moving said seat in one direction when the back is moved relative to the bottom, and spring means for sliding said seat in the opposite direction when the latch is released.

13. In a vehicle, the combination of a driver's seat, a sliding seat beside the driver's seat and normally spaced therefrom, the sliding seat comprising a bottom and a back pivoted to the bottom, and means operated by said back for sliding said sliding seat toward the driver's seat when the back is swung relative to the bottom.

14. In a vehicle having a body with a door, a driver's seat, a sliding seat beside the driver's seat, normally adjacent the side of the vehicle body and spaced from the driver's seat to permit passage between said seats, a latch for latching said sliding seat, and automatic means for releasing said latch and sliding said sliding seat toward the driver's seat to afford ready ingress to and egress from the back of the vehicle body.

15. In a vehicle, the combination of a driver's seat, a sliding seat, comprising a back and a bottom pivoted together for relative swinging movement, the sliding seat being beside the driver's seat and normally spaced therefrom, and means for automatically sliding said sliding seat toward the driver's seat upon such relative swinging movement.

16. In a vehicle, the combination of a driver's seat, a sliding seat, comprising a back and a bottom pivoted together for relative swinging movement, the sliding seat being beside the driver's seat and normally spaced therefrom, a latch for latching said sliding seat, and means for automatically releasing said latch and sliding said sliding seat toward the driver's seat upon such relative swinging movement.

17. In a vehicle, the combination of a driver's seat, a sliding seat comprising a back and a bottom pivoted together for relative swinging movement, the sliding seat being beside the driver's seat and normally spaced therefrom, means for automatically sliding said sliding seat toward the driver's seat upon such relative swinging movement, means for latching said seat in its moved position, and spring means for returning said seat to normal position when the latch is released.

18. In a vehicle having a body with a door, a driver's seat, a sliding seat beside the driver's seat, normally adjacent the side of the body and spaced from the driver's seat to permit passage between said seats, said sliding seat comprising a bottom and a back pivoted to said bottom, and means operated by said back when the latter is swung relative to said bottom for sliding the sliding seat toward the driver's seat to afford ready ingress to and egress from the rear of the vehicle body.

19. In a vehicle having a body with a door, a driver' seat, a sliding seat beside the driver's seat normally adjacent the side of the vehicle body and spaced from the driver's seat to permit passage between said seats, said sliding seat comprising a bottom and a back pivoted to said bottom, a latch for latching said seat, and a flexible member connected to said back and operated thereby when the latter is swung forwardly relative to the bottom for sliding the sliding seat toward the driver's seat to afford ready ingress to and egress from the rear of the vehicle body, the latch being also operated by said flexible member.

EARL G. WATROUS.